US007373306B1

(12) United States Patent
Lieberman et al.

(10) Patent No.: US 7,373,306 B1
(45) Date of Patent: May 13, 2008

(54) SYSTEMS AND METHODS FOR TRACKING EMPLOYEE LEAVES UNDER THE FMLA

(75) Inventors: Rachel S. Lieberman, Ridgefield, CT (US); Gay S. Devere, Darien, CT (US); Nancy Y. Mallory, Stamford, CT (US); David L. Roberts, Trumbull, CT (US); Jeannine R. Hall, Jackson, TN (US)

(73) Assignee: General Electric Capital Corporation, Stamford, CT (US)

( * ) Notice: Subject to any disclaimer, the term of this patent is extended or adjusted under 35 U.S.C. 154(b) by 715 days.

(21) Appl. No.: 09/752,274

(22) Filed: Dec. 29, 2000

(51) Int. Cl.
*A61B 5/00* (2006.01)
(52) U.S. Cl. .................................. 705/3; 706/46
(58) Field of Classification Search ............... 705/2–3, 705/7; 706/46
See application file for complete search history.

(56) References Cited

U.S. PATENT DOCUMENTS

| 5,701,400 | A | | 12/1997 | Amado |
| 5,787,234 | A | | 7/1998 | Molloy |
| 6,081,786 | A | | 6/2000 | Barry et al. |
| 6,101,488 | A | | 8/2000 | Hayashi et al. |
| 6,256,613 | B1 | * | 7/2001 | Falchuk et al. ................. 705/2 |
| 6,269,355 | B1 | * | 7/2001 | Grimse et al. ................. 706/46 |
| 6,401,079 | B1 | * | 6/2002 | Kahn et al. ................... 705/30 |
| 2002/0007287 | A1 | * | 1/2002 | Straube et al. ................. 705/3 |
| 2002/0022982 | A1 | * | 2/2002 | Copperstone et al. ........... 705/7 |
| 2002/0133376 | A1 | * | 9/2002 | Fritschen et al. ............... 705/2 |

OTHER PUBLICATIONS

Computer-guided FMLA administration; Gary Meyer; HRMagazine.Alexandria:May 1997; vol. 42, Iss.5; p. 45, 3pgs.*
Absence -Mgr.com Upgraded to Account for Family Medical Leave Act Requirements; Web-Based Tool Helps Employees to Better Manage Employee Absences; Business Editors; Business Wire; New York: Feb. 16, 2000. pp. 1-3.*
FMLA Tracker saves time, simplifies record keeping; Meade, Jim. HRMagazine. Alexandria: Mar. 1996. vol. 41, Iss.3; p. 132; pp. 1-4.*
Computer-guided FMLA administration by Gary Meyer, May 1997) in view of Absence Mgr.com Upgraded to Account for Famil Medical Leave Act Requirements.*
FMLA Tracker saves time, simplifies record keeping (Meade, Jim. HR Magazine. Alexandria:Mar. 1996; vol. 41; Iss.3; p. 132, pgs).*

* cited by examiner

*Primary Examiner*—Andrew Joseph Rudy
*Assistant Examiner*—Vanel Frenel
(74) *Attorney, Agent, or Firm*—Armstrong Teasdale LLP

(57) ABSTRACT

Methods and systems for processing and tracking employee requests for leave under the Family Medical Leave Act (FMLA) are disclosed. One method disclosed includes using servers configured with a database of FMLA forms and employee FMLA data to facilitate the steps of filing a FMLA leave request form, providing to the employee a conditional approval and a medical certification form to a named medical provider, checking the completed medical certification form for a recommendation of a medical care provider, and forwarding a final decision to the employee.

38 Claims, 5 Drawing Sheets

50

① ② ③

Initial FMLA Leave Request Form

Any incomplete information will delay the processing of this request

If you have any questions, please call the FMLA Center toll free at 877-555-FMLA/(877)-555-3652

① 52 Form submitted by: ___86___ ___88___ Date: ___66___
     If different from employee        GE Capital Business
Employee Name: John Smith                                        SS No: 123-45-6789
Home address: 58                                                  64
              (Street)        70          (City)    74        (State)        (Zip)
Home Phone: 60          MGR: _____         HR Rep.: _____
Date of Hire: 62    72  MGR phone: _____   76  HR Rep. phone: _____
              (mm/dd/yy)      82  Current Work Schedule: _____
Work Location: 68                                          (Days/Hours per week)
              (City/State)
Work phone: 78    ☐ Check this box if you are applying for disability benefits
            80          84    (note: you must call the disability center to apply for disability benefits)

② 54 Reason for Leave

Please check (✓) the reason for the leave you are requesting

HOSPITAL
90
☐ Inpatient hospital stay, recovery from stay or treatment related to stay.
92
☐ Incapacity due to pregnancy and prenatal care (before the child is born).
Expected delivery date: _____
Or                                          104

NEW CHILD
94
☐ Time to care for a newborn child or a newly placed adopted or foster care child (for moms and dads).
96

PERSONAL MEDICAL CONDITION
☐ Too sick to work for more than three consecutive days (including non-work days), and saw a health care provider twice;
Or
☐ Too sick to work for more than three consecutive days (including non-work days), and saw a health care provider once and given a continuing regimen 98 of treatment (e.g., therapy, medication);
Or
100 ☐ Incapacitated by or out to receive treatment for a serious chronic or permanent health condition (e.g., asthma, diabetes, cancer).
102

FAMILY
☐ To take care of/provide support for a sick eligible family member who falls into one of the categories above (except care of a new child). 106
(Name of family member & relationship to you)

③ 56 Type of Leave

Please check (✓) the type of leave you are requesting

108
☐ Full, Continuous Leave
Requested time period:
Begin date: ___110___ to ___112___ end date
           (mm/dd/yy)      (mm/dd/yy)

114
☐ Reduced Schedule
Requested reduced work schedule:
___116___ hrs./day
___118___ hrs./week
___120___ days/week Time period for which you are requesting the reduced schedule:
Begin date: ___122___ to ___124___ end date
           (mm/dd/yy)      (mm/dd/yy)

126
☐ Intermittent Leave (i.e., occasional, episodic)
If the medical condition is occasional or episodic, we require a specific time period for coverage under the FMLA (up to 1 year maximum)
Begin date: ___128___ to ___130___ end date
           (mm/dd/yy)      (mm/dd/yy)

① ② ③
Medical Certification for FMLA - Employee
Take this form to your medical provider for certification.
For questions regarding this form call 877-555-FMLA/877-555-3652, Return to the FMLA Center by _____

Name: __John Smith_____ 〈148〉                    SS No.: ___123-45-6789___ 〈150〉

•• ① •• Reason for Leave - Medical Provider must check ( ✓ ) any and all that apply.    • • • • • • • • • •••

PREGNANCY - I certify that the above patient is/has been/will be:
142  ☐ Incapacitated\* due to pregnancy.
     ☐ Receiving prenatal care.- Expected delivery date: _____

MEDICAL CONDITION - I certify that the above patient is/has been/will be:
☐ Incapacitated\* for more than 3 consecutive days and received treatment at least 2 times for this condition.
☐ Incapacitated\* for more than 3 consecutive days and received treatment for this condition and prescribed a regimen of continuing treatment (i.e. therapy, Rx).
☐ Incapacitated\* by or out of work to receive treatment for a chronic serious health condition which 1) requires periodic visits/treatment and 2) continues over extended period of time and 3) causes episodic or continuing incapacity\*.
☐ Incapacitated\* by a permanent/long-term condition for which patient is undergoing continuing treatment (i.e. Alzheimer's, severe stroke).
☐ Out of work to undergo examination/testing for a condition that would likely fall into one of the categories listed above or require inpatient stay.
\* Unable to work or perform regular daily activities.

HOSPITAL STAY - I certify that the above patient is/has been/will be:
☐ Inpatient in a hospital, hospice, or residential medical care facility.
☐ Out of work to receive treatment for a condition connected to previous inpatient stay.
☐ Recovering from inpatient stay and incapacitated (unable to work or perform regular daily activities).

•• ② •• Dates/Time of Leave - Medical Provider must indicate dates and times of leave    • • • • • • • • • •••

Continuous Leave: (If Requested) - I certify that the above patient has a medical need for leave as described.
144  Requested time period - Begin date: _____ to _____ end date
                                          (mm/dd/yy)           (mm/dd/yy)

Reduced Hours: (If Requested) - I certify that the above patient has a medical need for leave as described.
Requested reduced hours schedule _____ hrs./day _____ hrs./week _____days/week
Requested time period - Begin date: _____ to _____ end date
                                     (mm/dd/yy)            (mm/dd/yy)

Intermittent (i.e., occassional, episodic) Leave: (If Requested) - I certify that the above patient has a medical need for leave as described.
146 Requested intermittent schedule _____ hrs./day _____hrs./week _____ days/week
Indicate approximate duration of medical condition - Begin date: _____ to _____end date
                                                                  (mm/dd/yy)          (mm/dd/yy)

•• ③ •• Signature Stamp - Medical provider must sign and return form to the FMLA Center    • • • • • • • •••

Medical Provider
Signature: _____ 〈152〉   Phone: _____ 〈154〉   Fax: _____ 〈156〉

Print Name: _____ 〈158〉          Type of Practice: _____ 〈160〉
                                                         (field of speciality, if any)
Address: _____ 〈162〉
                              (city)       (state)       (zip)

Medical Certification for FMLA - Family Member
Take this form to your family member's medical provider for certification.
For questions regarding this form call 877-555-FMLA/877-555-3652. Return to the FMLA Center by _____

142 Patient Name: ___John Smith___ ⌐172   Relationship to Employee: ___SPOUSE___ ⌐174
    Employee Name: ___Janice Doe___ ⌐148   SS No.: ___123-45-6789___ ⌐150

(1) Reason for Leave - Medical Provider must check (✓) any and all that apply.

PREGNANCY - I certify that the above patient is/has been/will be:
- ☐ Incapacitated* due to pregnancy.
- ☐ Receiving prenatal care.- Expected delivery date: _____

MEDICAL CONDITION - I certify that the above patient is/has been/will be:
- ☐ Incapacitated* for more than 3 consecutive days and received treatment at least 2 times for this condition.
- ☐ Incapacitated* for more than 3 consecutive days and received treatment for this condition and prescribed a regimen of continuing treatment (i.e. therapy, Rx).
- ☐ Incapacitated* by or out of work to receive treatment for a chronic serious health condition which 1) requires periodic visits/treatment and 2) continues over extended period of time and 3) causes episodic or continuing incapacity*.
- ☐ Incapacitated* by a permanent/long-term condition for which patient is undergoing continuing treatment (i.e. Alzheimer's, severe stroke).
- ☐ Out of work to undergo examination/testing for a condition that would likely fall into one of the categories listed above or require inpatient stay.

\* Unable to work or perform regular daily activities.

HOSPITAL STAY - I certify that the above patient is/has been/will be:
- ☐ Inpatient in a hospital, hospice, or residential medical care facility.
144
- ☐ Out of work to receive treatment for a condition connected to previous inpatient stay.
- ☐ Recovering from inpatient stay and incapacitated (unable to work or perform regular daily activities).

(2) Dates/Time of Leave - Medical Provider must indicate dates and times of leave for the employee

Continuous Leave: (If Requested) - I certify that the above employee is needed to care for, or provide beneficial psychological comfort to spouse, child (who is under 18 or incapable of self-care), or parent for the following time period:
Requested time period - Begin date: _____ to _____ end date
                                    (mm/dd/yy)       (mm/dd/yy)

Reduced Hours: (If Requested) - I certify that the above employee needs reduced work hours to take care for, or provide beneficial psychological comfort to spouse, child (who is under 18 or incapable of self-care), or parent for the following time period:
Requested reduced hours schedule _____ hrs./day _____ hrs./week _____ days/week
Requested time period - Begin date: _____ to _____ end date
                                    (mm/dd/yy)       (mm/dd/yy)

Intermittent (i.e., occassional, episodic) Leave: (If Requested) - I certify that the above employee needs intermittent leave to care for, or provide beneficial psychological comfort to spouse, child (who is under 18 or incapable of self-care), or parent for the following time period:
146 Requested intermittent schedule _____ hrs./day _____ hrs./week _____ days/week
    Indicate approximate duration of medical condition - Begin date: _____ to _____ end date
                                                                     (mm/dd/yy)       (mm/dd/yy)

(3) Signature Stamp - Medical provider must sign and return form to the FMLA Center Medical Provider
Signature: ⌐152                          Phone: ⌐154           Fax: ⌐156

Print Name: ⌐158                         Type of Practice: ⌐160
                                                           (field of speciality, if any)
Address: ⌐162
         (city)          (state)        (zip)

FIG. 5

SYSTEMS AND METHODS FOR TRACKING EMPLOYEE LEAVES UNDER THE FMLA

BACKGROUND OF THE INVENTION

This invention relates generally to government regulation and more specifically to methods and systems for providing compliance with rules under the Family Medical Leave Act.

A company and company employees desire prompt and accurate assessment of leave requests under the Family Medical Leave Act (FMLA). Known FMLA assessment and evaluation methods have several disadvantages. For example, FMLA assessment and evaluation methods are largely paper-based. When using such methods, the tracking of granted leaves and leave requests by company and by employee is difficult and labor intensive. Multiple employees provide leave information in the form of leave requests, and the accuracy of the information depends on the experience and knowledge of the employees. In addition, using known methods and systems can be time consuming, requiring a significant amount of human resources personnel time. This is due in part to the fact that known systems and methods do not allow for easy retrieval of archived data and have no reporting capability. Therefore, every leave request involves additional research.

It would be desirable to provide methods and systems that provide guidance and an efficient way to ensure compliance with governmental rules such as those rules of the FMLA without the investment of time and resources commonly needed for known methods and systems.

BRIEF SUMMARY OF THE INVENTION

The present invention, in one aspect, is a method for processing and tracking requests for leave under the Family Medical Leave Act (FMLA). The method includes the steps of filing a FMLA leave request form, providing to the employee a conditional approval and a medical certification form to a named medical provider, receiving the completed medical certification form, and forwarding a final decision to the employee.

In another aspect, the present invention is a system that includes a computerized tool to facilitate the transfer of leave requests and associated information between an employee, a company and a medical care provider. The system includes at least one server configured with a database of FMLA forms. The system further includes at least one computer which can access the server for uploading and downloading forms.

BRIEF DESCRIPTION OF THE DRAWINGS

FIG. 3 is an example of an initial leave request form;

FIG. 4 is an example of an employee certification form; and

FIG. 5 is an example of a certification form for a family member of an employee.

DETAILED DESCRIPTION OF THE INVENTION

The present invention, in one aspect, is a method for prompt and accurate evaluation of whether an employee request for leave under the Family Medical Leave Act (FMLA) should be approved. In one embodiment, the method is implemented as a computerized method which reduces manual effort expended in conducting FMLA leave request evaluations and further reduces the potential for human error.

Figure 1:
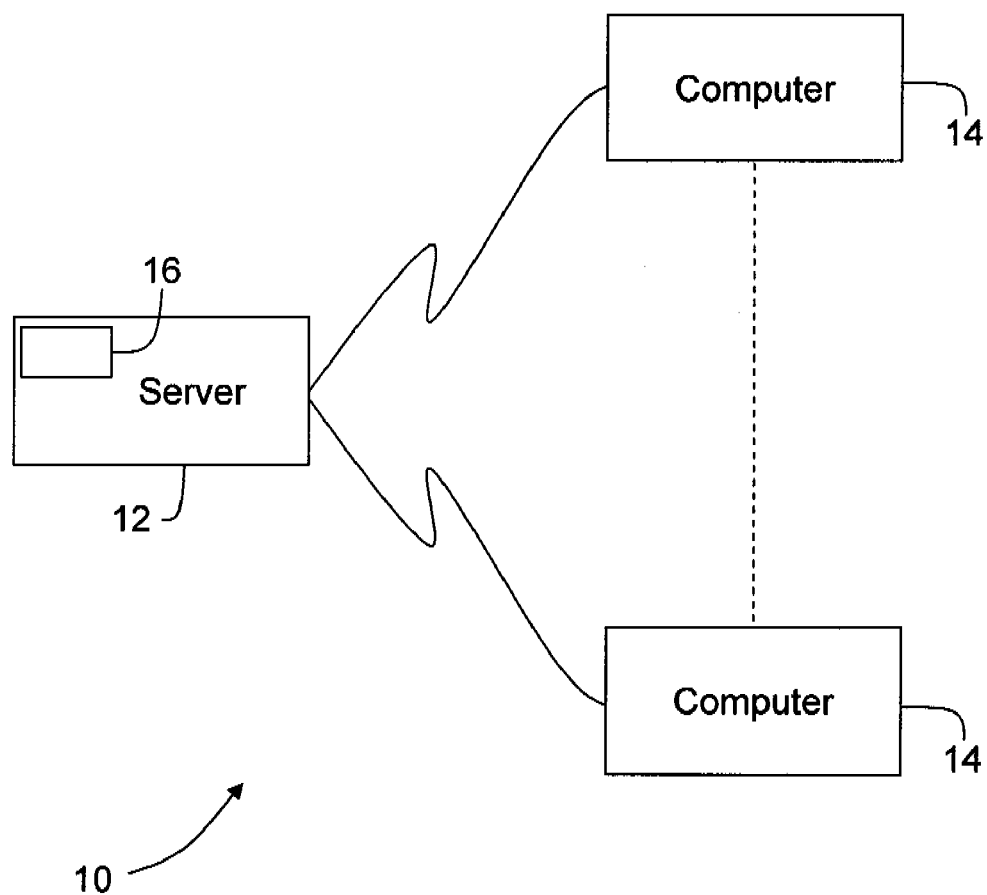
FIG. 1 is a system block diagram.

More specifically, FIG. 1 illustrates a system 10 in accordance with one embodiment of the present invention. System 10 includes a computer configured as a server 12 and a plurality of other computers 14 coupled to server 12 forming a network of computers. In the embodiment shown, computer 14 is a computer including a web browser, but may be any client system capable of being interconnected to a network through many interfaces including dial-in-connections, cable modems, special high-speed ISDN lines and networks such as local area networks (LANs) or wide area networks (WANs), including an intranet or the Internet. Computer 14 could be any client system capable of interconnecting to the Internet including a web based digital assistant, a web-based phone or other web-based connectable equipment. In another embodiment, server 12 is configured to accept FMLA leave request information over a telephone, for example, at least one of a voice responsive system where a user enters spoken FMLA information, or by a menu system where a user enters requested FMLA information using the touch keys of a telephone as prompted by server 12. In other contemplated embodiments, system 10 employs two or more of server 12 within the network of computers.

Server 12 is configured to read input data relating to a request for leave under the FMLA. In one embodiment, server 12 is configured with a user interface including web pages for use as data entry forms which a user can access and view using a web browser from one of computers 14. The web pages can be printed by a user or, alternatively, the user may input pertinent data into the web page for uploading to server 12. System 10 therefore allows access from any one of computers 14 to an FMLA database 16. System 10 allows a user to input and upload data relating to a request for leave and supporting data relating to the request for leave. Uploaded user data, for example, length of employment of an employee, are compared with current company employee data which are stored, along with the web pages, in database 16 within server 12. In one embodiment, a user may dial or directly login to the Intranet or Internet to gain access. Each computer 14 includes an interface for communicating with server 12. A computerized leave request evaluation tool, as described below in more detail, is stored in server 12 and can be accessed by a requester at any one of computers 14. In one embodiment, the data may be submitted to server 12 via the Internet. In another embodiment, the data may be submitted via an Intranet.

Figure 2:
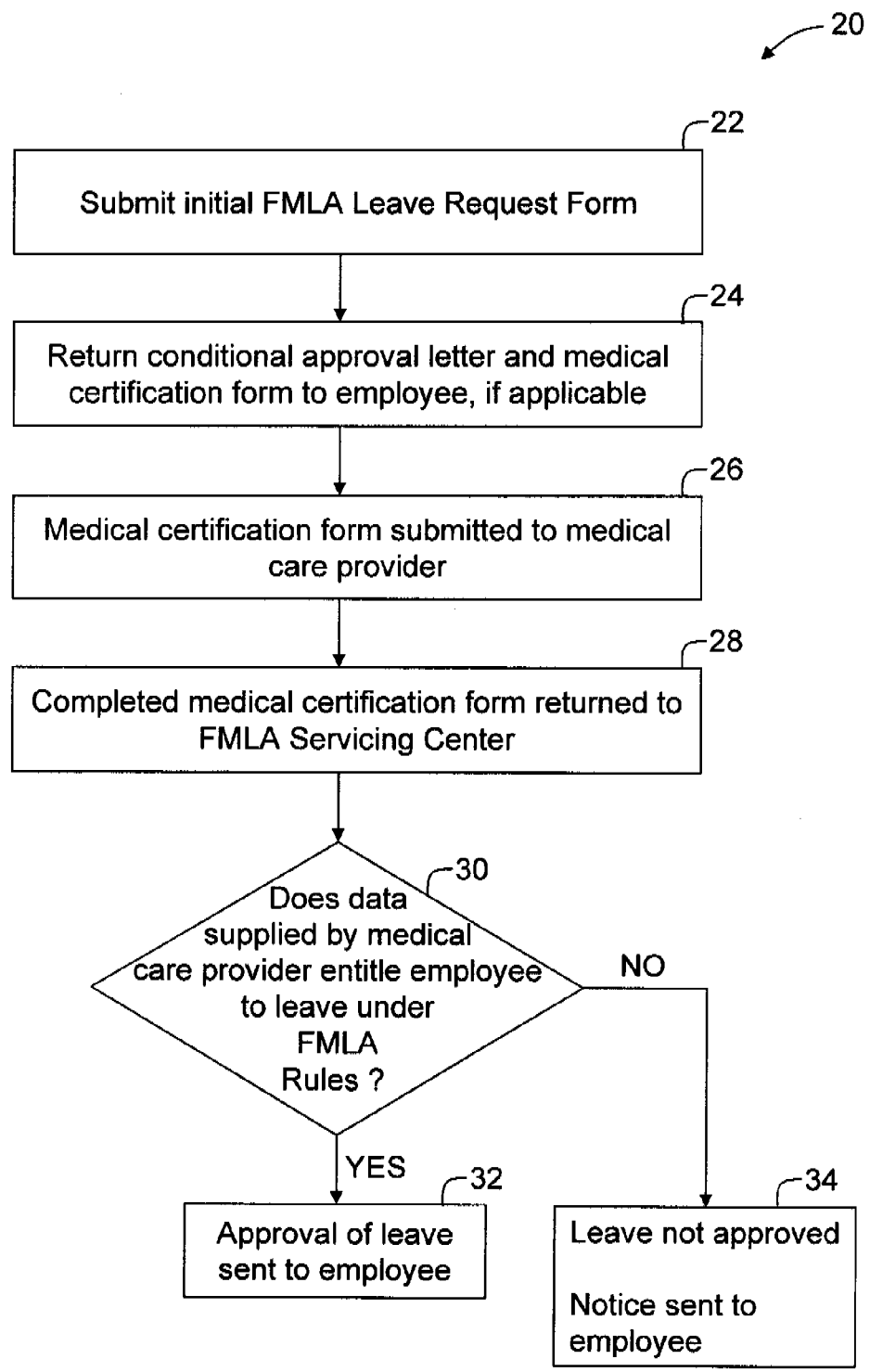
FIG. 2 is a flow chart diagramming an employee leave request and approval process.

Referring to FIG. 2, a flow chart 20 for process steps executed in creating a leave request under the FMLA and subsequent steps leading up to approval or dismissal are shown. More specifically, a requester for leave can submit 22 an initial FMLA leave request form (described below) to create a new leave request. In one embodiment the leave request is uploaded from one of computers 14 to server 12.

Upon receipt of the request the employee is returned 24 a conditional approval, if the employee is entitled to leave under the FMLA. Conditions for FMLA leave include, but are not limited to, the person requesting leave has to be an actual company employee, who has been employed by the company for a specified length of time, and works a requisite number of hours. Additionally it is possible that an employee has used up all leave time under the FMLA, therefore no conditional approval would be returned, but rather a disapproval of the FMLA request.

In one embodiment, the conditional approval is a letter mailed to the employee. In another embodiment, the conditional approval is E-mailed to the employee. In addition, the employee is also supplied one of two alternative medical certification forms, either by mail or E-mail, one covering the employee or another covering a family member of the employee. The medical certification form received is dependent upon the leave requested, leave for employee medical conditions or leave for a medical condition of a qualifying family member of the employee. In an alternative embodiment, forms are sent to the employee electronically, that is, server 12 downloads to the employee the conditional approval and medical certification forms and employee accesses the forms at one of computers 14.

The employee then submits 26 the medical certification form to a medical care provider. In one embodiment, submission of the medical certification form is manual, for example, hand delivery during an office visit to the medical care provider. An alternative is delivery by a mail system such as the postal service. In another alternative embodiment, the medical certification form is electronically mailed to the medical care provider, either in addition to, or instead of being sent to the employee as described above. In an alternative embodiment, the medical care provider can access server 12 (shown in FIG. 1), for example, via the Internet, and download the medical certification forms.

The medical care provider completes the medical certification form, either electronically or by hand, and then returns 28 the medical certification form, either electronically or through the mail, to the proper person or group handling FMLA leave requests for the particular company. In still another alternative embodiment, server 12 is configured to accept FMLA certification information over a telephone, for example, by either of a voice responsive system where a medical care provider enters spoken FMLA recommendation information, or by a menu system where a medical care provider enters an FMLA recommendation using the touch keys of a telephone as prompted by server 12.

Once the completed medical certification form has been returned to the company, electronically, on paper, or via telephone, the form is verified to make sure the medical provider has determined that a medical leave is appropriate for the particular employee situation. In one embodiment and as described above, server 12 is configured to upload and store within database 16 entered data from the medical certification form. Data from the medical certification form is either entered by hand from a paper medical certification form or stored directly from an electronic submission of a medical certification form.

If the request for leave is in order based upon a recommendation of the medical care provider, and if the employee is entitled to leave under existing FMLA rules, the employee is notified 32 that the request for leave under the FMLA is approved. Alternatively, if the request for leave is not in compliance with existing FMLA rules for leave, or if the medical care provider has determined that leave is not appropriate in a given situation, the employee is notified 34 that the request for leave under the FMLA has been denied. One example of a request not being in compliance with current FMLA rules is that leave is not allowed for the medical care of one's sibling. Alternatively, care of one's spouse is a valid reason for a FMLA leave request.

Requests for leave are tracked by system 10 in database 16 (both shown in FIG. 1) so that a company can accurately track how much FMLA time individual employees have remaining based on current FMLA rules, for example, the number of days of leave allowed over a calendar year.

Referring to FIG. 3, an exemplary embodiment of an initial FMLA leave request form 50 is shown. In one embodiment, form 50 is configured to be stored within server 12 (shown in FIG. 1) as a web page. In other embodiments, form 50 is a paper form or a form printed from a computer database of forms, such as database 16 (shown in FIG. 1).

In the embodiment shown in FIG. 3, form 50 includes three sections, an employee information section 52, a reason for leave section 54 and a leave type section 56. Employee information section 52 includes employee personal data such as employee name 58, address 60, telephone number 62, social security number 64 and a date of submission 66. Also included is employee company data including a hire date 68, a name of the employee's manager 70, manager's telephone number 72, a name of the employee's human resources representative 74 and that person's telephone number 76, employee work location 78, employee work telephone 80 and employee work schedule 82. A check box 84 is included for marking if the employee is applying for a disability benefit.

Sometimes health conditions arise where an employee is entitled to leave under the FMLA, but those health conditions arise so quickly and severely that the employee is unable to access or fill out form 50. In anticipation of such circumstances, FMLA rules allow other persons, for example, a spouse, a manager, or a human resources representative, to complete form 50 on the employee's behalf. The above examples are illustrative only and are not to be considered exhaustive. To efficiently deal with such situations, information section 52 further includes fields where a person filling out the form for the employee enters their name 86 and business affiliation 88.

Still referring to FIG. 3, reason to leave section 54 of form 50 includes short explanations describing the medical situations that qualify for leave under the FMLA. Checkboxes associated with each qualifying medical situation are included for the convenience of the person completing the form. In one embodiment, situations and the associated check boxes include, hospital stays and recovery times 90, pregnancy and prenatal care 92, newborn or newly adopted child care 94, personal illness 96, personal illness with continuing treatment 98, and illnesses that are incapacitating 100. If the requested leave is for a pregnancy, an expected delivery date field 104 is provided. Other situations that are covered by the FMLA include certain of the above enumerated qualifying medical situations for an eligible family member. A field 106 is provided so that the family members name and relationship to the employee may be entered.

Again referring to FIG. 3, type of leave section 56 of form 50 falls into three categories under the FMLA. Section 56 includes a full or continuous leave selection 108 including a begin date 110 and an end date 112. A reduced schedule selection 114 includes reductions for hours/day 116, hours/week 118 and days/week 120 and further includes a begin date 122 and an end date 124 for the reduced schedule. An intermittent leave 126 allows for sporadic and repeated absences for a recurring medical condition and includes a beginning date 128 and an ending date 130 which is limited to one calendar year from beginning date 128.

In one embodiment, after the employee or substitute completes entries into the above described fields, the request is uploaded and stored within database 16 in server 12. Employees in an FMLA servicing center, for example, a human resources department, are notified of the new leave request so that a conditional approval letter, if the employee is eligible for leave under the FMLA, and a medical certification form can be generated and forwarded to the requesting employee. Alternatively, system 10 is configured to automatically download to an employee a conditional approval, if the employee is eligible for leave, and a medical certification form upon receipt and storage of the leave request. In another embodiment, system 10 generates a medical certification form and conditional approval letter to be mailed to the requesting employee.

Typically, and in one embodiment, a "button" (not shown) on a computer display labeled "SUBMIT", or another like term, is utilized to upload the leave request to the FMLA servicing center and to inform FMLA servicing center employees of the existence of the leave request.

Referring now to FIG. 4, an exemplary embodiment of an employee medical certification form 140 is shown. Employee medical certification form 140 includes similar information as does form 50 (shown in FIG. 3). Included in Form 140 are a reason for leave 142, dates of leave 144 and a signature stamp 146. An employee name 148 and social security number 150 are also included for identification purposes. Reasons for leave 142 include a plurality of check boxes, similar to those described above in FIG. 3, to be filled in by a medical provider who is instructed to check or mark as any as applicable and appropriate for a pregnancy, medical condition, or a hospital stay. Dates of leave 144 include fields for entry of continuous, reduced hours and intermittent leave like the fields described in FIG. 3, the fields to be filled in by the medical care provider.

Signature stamp 146 includes fields which identify the medical care provider to the FMLA servicing center and include a signature field 152, a physician telephone number 154, a physician facsimile number 156, a printed physician name 158, a type of practice 160 the physician is engaged in, and physician address information 162.

FIG. 5 is an exemplary embodiment of a family member medical certification form 170. Family member medical certification form 170 includes all the same fields and information as does form 140 (shown in FIG. 4). In addition, form 170 includes fields to identify a patient name 172 and a patient relationship 174 to the requesting employee.

Upon receipt or upload of one of form 140 or 170, information contained in form 140 and 170 is checked for a medical provider recommendation and whether or not the requested time of leave from the employee, as found on form 50 and in the conditional approval, agrees with the amount of leave recommended by form 140 or 170, whichever applies to the particular case. If the medical care provider, or physician, agrees that a leave is warranted under the FMLA, the FMLA servicing center will forward to the employee an approval of leave for the time recommended by the physician, or the leave time the employee has remaining, whichever is shorter. If the physician determines that no leave is warranted, the employee is notified that his or her request for a leave under the FMLA has been denied, including reasons for denial. Again the notifications are electronic in nature, such as electronic mailings, or may be in paper form and deliverable through regular mail.

The methods and systems herein described provide a company with tools for consistent application of the conditions for leave under the FMLA. In addition, the methods and systems provide a mechanism for the tracking of employee FMLA requests while also making the process of applying for a leave simpler for the employees and the companies trying to administer leaves under the FMLA.

While the invention has been described in terms of various specific embodiments, those skilled in the art will recognize that the invention can be practiced with modification within the spirit and scope of the claims.

What is claimed is:

1. A method for processing and tracking requests for leave under the Family Medical Leave Act (FMLA) using a web-based computer system configured with at least one server which includes an employee FMLA database, the system including a plurality of client systems networked to the at least one server, said method comprising the steps of:

displaying on a first client system at least one web page including a FMLA leave request form;

prompting a requester to enter request data directly into the FMLA leave request form, the requester including at least one of an employee and a representative of the employee, the request data including information relating to a reason for a FMLA leave request, a name of the employee and a name of an employer, wherein the first client system is associated with the requester;

automatically uploading the FMLA leave request form with the request data from the first client system to the server, wherein the server is associated with the employer;

determining, at the server, whether the employee is eligible to receive a conditional approval of the FMLA leave request form;

automatically downloading the conditional approval from the server to the first client system for viewing by the requester;

automatically downloading the conditional approval and a medical certification form to a second client system associated with a medical provider identified by the requester;

displaying on the second client system at least one web page including the conditional approval and the medical certification form;

prompting the medical provider to enter medical data directly into the medical certification form displayed on the second client system, the medical data including a recommendation relating to the reason for the FMLA leave request;

entering the medical data including the recommendation relating to the reason for the FMLA leave request directly into the medical certification form by the medical provider via the second client system;

automatically uploading a completed medical certification form from the second client system to the server for storage in the FMLA database;

comparing, at the server, the request data entered by the requester to the medical data entered by the medical provider, and determining whether the reason provided by the requester for the FMLA leave request corresponds with the recommendation provided by the medical provider; and transmitting from the server a final approval or disapproval to the requester at the first client system after performing the data comparison at the server.

2. A method according to claim 1 further comprising the step of tracking employee leaves, leave requests, and leave time remaining for employees under the FMLA.

3. A method according to claim 1 wherein said step of automatically uploading the FMLA leave request form further comprises the step of uploading employee personal data and employee company data.

4. A method according to claim 1 wherein said step of automatically uploading the FMLA leave request form further comprises the step of uploading a reason for the requested medical leave.

5. A method according to claim 1 wherein said step of automatically uploading the FMLA leave request form further comprises the step of uploading a type of medical leave requested.

6. A method according to claim 1 wherein said step of automatically uploading the FMLA leave request form further comprises the step of completing the form on the requesting employees behalf.

7. A method according to claim 1 wherein said step of automatically uploading a completed medical certification form further comprises the step of uploading a recommendation from the medical provider relating to the reason for the requested medical leave.

8. A method according to claim 7 wherein said step of uploading a recommendation from the medical provider relating to the reason for the requested medical leave further comprises the step of uploading a type of medical leave deemed appropriate by a medical care provider.

9. A method according to claim 1 wherein said step of automatically uploading a completed medical certification form further comprises the step of uploading medical care provider recommended dates and times for a leave.

10. A method according to claim 1 wherein said step of automatically uploading a completed medical certification form further comprises the step of uploading a signature stamp of a medical care provider.

11. A method according to claim 1 wherein said step of automatically uploading the FMLA leave request form further comprises the step of accepting FMLA leave request information over a telephone by at least one of a voice responsive system where a user enters spoken FMLA information and a menu system where a user enters requested FMLA information using the touch keys of a telephone.

12. A method according to claim 1 wherein said step of automatically uploading a completed medical certification form further comprises the step of accepting FMLA information over a telephone by at least one of a voice responsive system where a medical care provider enters spoken FMLA recommendation information and a menu system where a medical care provider enters an FMLA recommendation using the touch keys of a telephone.

13. A system for facilitating processing and tracking of requests under the Family Medical Leave Act (FMLA), said system comprising:
a first computer associated with a requester, the requester including at least one of an employee and a representative of the employee;
a second computer associated with a medical provider identified by the requester;
a server associated with an employer further comprising:
an employee FMLA request database; and
a plurality of FMLA forms designed to accept data relating to a request for a leave under the FMLA; and
a network connecting said server to said computers, said server configured to:
display on the first computer the plurality of said forms including a FMLA leave request form,
prompt the requester to enter request data directly into the FMLA leave request form including information relating to a reason for a FMLA leave request, a name of the employee and a name of the employer,
receive the FMLA leave request form with the leave data from the first computer,
determine whether the employee is eligible to receive a conditional approval of the FMLA leave request form,
automatically download the conditional approval to the first computer for viewing by the requester,
automatically download the conditional approval and a medical certification form to the second computer,
display on the second computer the conditional approval and the medical certification form,
prompt the medical provider to enter medical data directly into the medical certification form displayed on the second computer, the medical data including a recommendation relating to the reason for the FMLA leave request,
receive a completed medical certification form containing medical data including the recommendation relating to the reason for the FMLA leave request directly entered into the medical certification form by the medical provider from the second computer for storage in the FMLA database,
compare the request data entered by the requester to the medical data entered by the medical provider to determine whether the reason provided by the requester for the FMLA leave request corresponds with the recommendation provided by the medical provider, and
transmit a final approval or disapproval to the requester at the first computer after performing the data comparison.

14. A system according to claim 13 wherein said server and said computers are configured to allow the requester to submit the leave request via the Internet.

15. A system according to claim 13 wherein said server and said computers are configured to allow the requester to submit the leave request via an Intranet.

16. A system according to claim 13 wherein said network is one of a wide area network and a local area network.

17. A system according to claim 13 wherein said server is further configured to track employee leaves, leave requests, and leave time remaining for employees under the FMLA.

18. A system according to claim 13 wherein said server is further configured to upload and store in said database employee leave requests.

19. A system according to claim 18 wherein said server is further configured to upload and store employee personal data and employee company data.

20. A system according to claim 18 wherein said server is further configured to upload and store a reason for the requested medical leave.

21. A system according to claim 18 wherein said server is further configured to upload and store a type of medical leave requested.

22. A system according to claim 18 wherein said server is further configured to allow a third person to upload a leave request form on the requesting employees behalf.

23. A system according to claim 13 wherein said server is further configured to upload a completed medical certification form.

24. A system according to claim 23 wherein said server is further configured to upload a reason for the requested medical leave.

25. A system according to claim 24 wherein said server is further configured to upload a type of medical leave deemed appropriate by a medical care provider.

26. A system according to claim 23 wherein said server is further configured to upload medical care provider recommended dates and times for a leave.

27. A system according to claim 23 wherein said server is further configured to upload a signature stamp of a medical care provider.

28. A system according to claim 13 wherein said server is configured to download a medical certification form to a named medical care provider.

29. A system according to claim 13 wherein said server is configured to send to an employee at least one of a conditional approval and a medical certification form to an employee requesting leave.

30. A system according to claim 13 wherein said server is configured to accept FMLA leave request information over a telephone by at least one of a voice responsive system where a user enters spoken FMLA information and a menu system where a user enters requested FMLA information using the touch keys of a telephone.

31. A system according to claim 13 wherein said server is configured to accept FMLA information over a telephone by at least one of a voice responsive system where a medical care provider enters spoken FMLA recommendation information and a menu system where a medical care provider enters an FMLA recommendation using the touch keys of a telephone.

32. Apparatus for processing and tracking of requests under the Family Medical Leave Act (FMLA), comprising:
means for storing a plurality of FMLA forms;
means for displaying on a first client system at least one FMLA form including a FMLA leave request form;
means for prompting a requester to enter request data directly into the FMLA leave request form, the requester including at least one of an employee and a representative of the employee, the request data including information relating to a reason for a FMLA leave request, a name of the employee and a name of an employer, wherein the first client system is associated with the requester;
means for automatically uploading the FMLA leave request form with the request data from the first client system to a server, wherein the server is associated with the employer;
means for determining whether the employee is eligible to receive a conditional approval of the FMLA leave request form;
means for automatically downloading the conditional approval from the server to the first client system;
means for automatically downloading the conditional approval and a medical certification form to a second client system associated with a medical provider identified by the requester;
means for displaying on the second client system the conditional approval and the medical certification form;
means for prompting the medical provider to enter medical data directly into the medical certification form displayed on the second client system, the medical data including a recommendation relating to the reason for the FMLA leave request;
means for entering the medical data including the recommendation relating to the reason for the FMLA leave request directly into the medical certification form by the medical provider via the second client system;
means for automatically uploading a completed medical certification form from the second client system to the server for storage;
means for comparing at the server the request data entered by the requester to the medical data entered by the medical provider to determine whether the reason provided by the requester for the FMLA leave request corresponds with the recommendation provided by the medical provider; and
means for transmitting from the server a final approval or disapproval to the requester at the first client system after performing the data comparison at the server.

33. Apparatus according to claim 32 wherein said means for storing a plurality of FMLA forms comprises at least one server.

34. Apparatus according to claim 33 wherein said servers is further configured to track employee leaves, leave requests, and leave time remaining for employees under the FMLA.

35. A computer program embodied on a computer readable medium for processing and tracking requests for leave under the Family Medical Leave Act (FMLA), said program comprising a code segment that:
displays on a first client system at least one web page including a FMLA leave request form;
prompts a requester to enter request data directly into the FMLA leave request form, the requester including at least one of an employee and a representative of the employee, the request data including information relating to a reason for a FMLA leave request, a name of the employee and a name of an employer, wherein the first client system is associated with the requester;
automatically uploads the FMLA leave request form with the request data from the first client system to the server, wherein the server is associated with the employer;
determines at the server whether the employee is eligible to receive a conditional approval of the FMLA leave request form;
automatically downloads the conditional approval from the server to the first client system for viewing by the requester;
automatically downloads the conditional approval and a medical certification form to a second client system associated with a medical provider identified by the requester;
display on the second client system at least one web page including the conditional approval and the medical certification form;
prompts the medical provider to enter medical data directly into the medical certification form displayed on the second client system, the medical data including a recommendation relating to the reason for the FMLA leave request;
receives the medical data including the recommendation relating to the reason for the FMLA leave request entered directly into the medical certification form by the medical provider via the second client system;
automatically uploads a completed medical certification form from the second client system to the server for storage in the FMLA database;
compares at the server the request data entered by the requester to the medical data entered by the medical provider to determine whether the reason provided by the requester for the FMLA leave request corresponds with the recommendation provided by the medical provider; and
transmits from the server a final approval or disapproval to the requester at the first client system after performing the data comparison at the server.

36. A computer readable medium according to claim 35 further comprising employee personal data and employee company data.

37. A computer readable medium according to claim 35 further comprising a record of a reason for the requested medical leave.

38. A computer readable medium according to claim 35 further comprising a record of completed medical certification forms.

* * * * *